(12) United States Patent  (10) Patent No.: US 7,512,718 B2
Dickson  (45) Date of Patent: Mar. 31, 2009

(54) RECONFIGURABLE COMPUTING ARRAY WITHOUT CHASSIS

(75) Inventor: Lawrence John Dickson, National City, CA (US)

(73) Assignee: Lawrence J. Dickson, National City, CA (US)

( * ) Notice: Subject to any disclaimer, the term of this patent is extended or adjusted under 35 U.S.C. 154(b) by 498 days.

(21) Appl. No.: 11/111,147

(22) Filed: Apr. 20, 2005

(65) Prior Publication Data

US 2006/0242339 A1    Oct. 26, 2006

(51) Int. Cl.
    *G06F 3/00* (2006.01)
(52) U.S. Cl. .................... 710/2; 710/15; 710/18
(58) Field of Classification Search .......... None
    See application file for complete search history.

(56) References Cited

U.S. PATENT DOCUMENTS

| | | | |
|---|---|---|---|
| 5,602,721 A | 2/1997 | Slade et al. |
| 5,737,189 A | 4/1998 | Kammersgard et al. |
| 5,761,032 A | 6/1998 | Jones |
| 5,909,357 A | 6/1999 | Orr |
| 5,949,644 A | 9/1999 | Park |
| 5,951,665 A | 9/1999 | Crane, Jr. et al. |
| 5,984,732 A | 11/1999 | Mehring |
| 6,054,846 A | 4/2000 | Castleman |
| 6,073,333 A | 6/2000 | Orr |
| 6,249,427 B1 | 6/2001 | Carroll |
| 6,282,596 B1 | 8/2001 | Bealkowski et al. |
| 6,401,157 B1 | 6/2002 | Nguyen et al. |
| 6,469,901 B1 | 10/2002 | Costner |
| 6,487,623 B1 | 11/2002 | Emerson et al. |
| 6,535,944 B1 | 3/2003 | Johari et al. |
| 6,597,569 B1 | 7/2003 | Unrein |
| 6,640,282 B2 | 10/2003 | MacLaren et al. |
| 6,661,236 B2 | 12/2003 | Goers et al. |
| 6,698,851 B1 | 3/2004 | Ludl |
| 2003/0050019 A1 | 3/2003 | Dowling et al. |

(Continued)

FOREIGN PATENT DOCUMENTS

JP    H11-194857 A    7/1999

(Continued)

OTHER PUBLICATIONS

International Search Report and Written Opinion of the ISA, May 24, 2007.

(Continued)

*Primary Examiner*—Eron J Sorrell
(74) *Attorney, Agent, or Firm*—Chen Yoshimura LLP

(57) ABSTRACT

A computing device having a unique form factor and adapted for connecting to an external device is described. The computing device includes external connector(s), computing node(s), a power unit, and a flexible enclosure structure encasing them. The enclosure structure is made of flexible materials so that the computing device forms a physically integrated unit free of a rigid frame and can be mechanically supported by its external connectors without a chassis. At least one computing node has a computing state machine and programs that controls the behavior of the computing nodes at least during a connection event and a disconnection event. The computing device can be hot-swapped and function properly between these events. Also described is a reconfigurable computing system that includes one or more computing devices described above and one or more host computers, as well as programming techniques for accomplishing hot swapping of the computing devices.

21 Claims, 4 Drawing Sheets

U.S. PATENT DOCUMENTS

2004/0133715 A1* 7/2004 Hagiwara et al. ............. 710/72
2006/0236014 A1* 10/2006 Yin et al. ................... 710/303

OTHER PUBLICATIONS

Transputer Instruction Set—A Compiler Writer's Guide, INMOS Limited, Pretice Hall International (UK) Ltd. 1988.

E. Dickmanns, R. Behringer, C. Brudigam, D. Dickmanns, F. Rhomanek and V. V. Holt, An All-Transputer Visual Autobahn-Autopilot/Copilot, Transputer Applications and Systems '93, pp. 42-51, R. Grebe et al. (Eds), IOS Press, 1993.

IMS B008 User Guide And Reference Manual, INMOS Limited, 1990.

occam(R) 2 Reference Manual, NMOS Limited, Prentice Hall 1988.

S. Booth, K. Bowler, D. Candlin, R. Kenway, B. Pendleton, A Thornton, D. Wallace, J. Blair-Fish and D. Roweth, Large Scale Applications Of Transputers In HEP: The Edinburgh Concurrent Supercomputer Project, Computer Phys. Comm. 57 (1989) 101-107.

D. Nicole, Esprit Project 1085—Reconfigurable Transputer Processor Architecture, CONPAR 88, C. Jesshope and K. Reinartz (Eds.), pp. 81-89, Cambridge Univ. Press. 1989.

V. Graefe, Two Multi-Processor Systems For Low-Level Real-Time Vision, Robotics and Artifical Intelligence, M. Brady, L. Gerhardt and H. Davidson (Eds.), pp. 301-308, Springer-Verlag 1984.

L. Dickson, occam(TM) Road Map for the DOS PC, PDPTA '96 Int'l Conf., pp. 1010-1019, 1996.

SATA Hot-plug, Maxtor Corp, Sep. 2003.

Sophisticated Control In Modular Format, http://www.engineeringtalk.com/news/amp141.html, printed from the Internet Dec. 8, 2004.

J. Okamoto, J. Adamowski, and T. Sasaki, Modular Microprocessor Kit For Undergraduate Laboratory On Industrial Automation, IEEE Tran. Education, vol. 44, No. 2, May 2001.

J. Barton, K. Delaney, C. O'Mathuna and J. Paradiso, Miniaturised Modular Wireless Sensor Networks, http://www.media.mit.edu/resenv/pubs/papers/2002-09-NMRC-UBICOMP-poster.pdf, estimated publication date 2002.

E. Von Schweber and L. Von Schweber, Computing Fabrics, PC Week Online Oct. 26, 1998, http://www.informaniacs.com/pubs/pcweek_computings_fabrics-computings-next-wave....

* cited by examiner

RECONFIGURABLE COMPUTING ARRAY WITHOUT CHASSIS

BACKGROUND OF THE INVENTION

1. Field of the Invention

This invention relates to methods of assembling and configuring computing devices and computing devices so assembled and configured.

2. Description of the Related Art

Conventionally, computers and many other electronic devices are built on a chassis. Chassis, also called case, is the metal frame that serves as the structural support for electronic components. Typically, every computer system has at least one chassis to house the circuit boards and wiring. The chassis also contains slots for expansion boards. If one wants to insert more boards than there are slots, one will need an expansion chassis, which provides additional slots. (See, for example, www.thefreedictionary.com/chassis, and sbc.webopedia.com/TERM/S/chassis.html.) Shared by all concepts of chassis are the requirements of stiffness and support, as required to hold components in place whose orientation is critical and must be held within tight tolerances, and which are relatively heavy and subjected to other forces such as heat stress and vibration or pressure caused by heat dissipation devices or the air or liquid flows driven by them.

Driven by these requirements is the distinction between, on the one hand, structural chassis parts and, on the other hand, electronic parts, such as circuit boards, cabling, and wiring, where the former are heavy, strong, and usually rectangular in shape, and take no active part in the device function, while the latter are mounted within the former and do all the electronics. In the course of development it is normal to find chassis panels open and cables and components hanging loose, subject to frequent change by engineers, who are experienced enough to position them by hand for successful operation despite the lack of physical support. One such example is described in "Modular Microprocessor Kit for Undergraduate Laboratory on Industrial Automation", IEEE Trans. Education, Vol. 44, No. 2, page 218, May 2001. Such manipulation of chassisless components is very useful to developers, despite its severe limitations, parts not designed for it, strains on cables, danger of electrical short circuits, and limitation of component count by connector arrays designed for chassis use.

At the same time, miniaturization of peripheral components has progressed to such a degree that chassisless or dangling peripherals such as the iPod™ are now available to general-purpose users. A similar miniaturization of powerful central processing units (CPUs) is underway at the die level (Michael Flynn, Keynote Address, CSREA Multiconference, Las Vegas, Nev., Jun. 21, 2004), but the complexity of state control, communications hardware and system software harnesses has kept system implementations of such CPUs within the conventional chassis.

SUMMARY OF THE INVENTION

Accordingly, the present invention is directed to a method and apparatus that substantially obviates one or more of the problems due to limitations and disadvantages of the related art.

An object of this invention is to eliminate the chassis in many powerful computing devices using new, low power technology. Another object of the present invention is to provide a design directed toward normal use and reconfiguration outside a chassis.

Another object of the present invention is to permit such reconfiguration to take place normally within a running program using reconfigured hardware, adding or removing resources without rebooting or interrupting the program.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, embodiments of the present invention provide a computing device adapted for connecting to an external device, the computing device includes: one or more external connectors adapted for connecting to the external device and including at least a ground line, a power line and one or more data input/output (I/O) lines; one or more computing nodes connected to each other and to the external connectors, each computing node including a central processing unit, a memory, or an input/output interface, wherein at least one computing node has a computing state machine and programs that describe and control the behavior of the computing nodes at least during a connection event when an external connector is being connected to the external device and during a disconnection event when the external connector is being disconnected from the external device; a power unit connected to the external connectors and the computing nodes for supplying power to the computing nodes or for filtering signals on the power line; and a flexible enclosure structure encasing the external connectors, computing nodes and power unit and permitting the external connectors to be connected with the external device, the enclosure structure being made of flexible materials, whereby the computing device forms a physically integrated unit by the enclosure structure free of a rigid frame. The computing device is tough, small, and lightweight. It can be mechanically supported by external connector(s) without a chassis. It can be hot-plugged and hot-unplugged and function properly, contributing resources to a program that may already be running, between these events.

In another aspect, embodiments of the present invention provide a reconfigurable computing system that includes one or more computing devices described above and one or more host computers. Each host computer has an outlet adapted to be connected to an external connector of a computing device, the outlet including at least a ground line, a power line and one or more data input/output (I/O) lines. Each computing device is connected to a host computer either directly or through other computing devices. Each computing device has at least one computing node programmed to receive or transmit information on the I/O lines from or to another computing device or host computer connected to the computing device, to be in transmission readiness regardless of whether a corresponding program on the connected computing device or host computer is ready, and to receive or transmit information when the corresponding program is ready. Each host computer is programmed to receive or transmit information on the I/O lines from or to a computing device connected to it, to be in transmission readiness regardless of whether a corresponding program on the connected computing device is ready, and to receive or transmit information when the corresponding program on the connected computing device is ready. The computing devices and the host computers form a connected set and communicate with each other through the I/O lines.

The present specification also describes implementations of the power unit and programming of the computing notes that support hot-plugging and hot-unplugging.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1A:
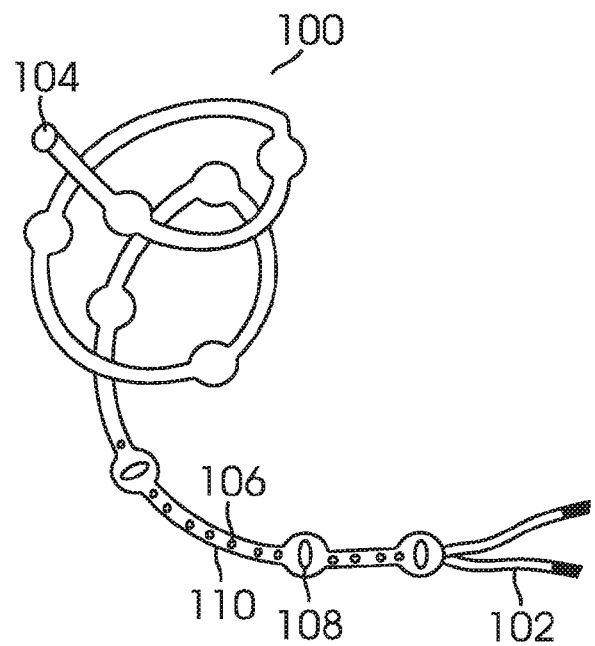
FIGS. 1(a) and 1(b) illustrate embodiments of the present invention.

This invention concerns computing devices or assemblies, each including a processor or processors, memory, and data input/output (IO) connections, together with the power supplies needed to make all these operate normally given a standard external electrical power source of one kind or another. According to embodiments of the present invention, a power unit (sometimes referred to as a "locomotive" in this specification) together with a number of computing devices (sometimes referred to as "nodes" in this specification) forms a physical unit, referred to as a "segment" or "computing segment" in this specification, which is capable of joining with other segments to pass power and data and perform computations. Each computing node may be a CPU, memory, IO interface, other components, or combinations of the above.

One feature of embodiments of the present invention is that its components are chassisless, so that each physical unit (segment) needs no more mechanical and electrical support than is provided by its power/data connections, whether these be in cable form, or take some other flexible form such as a fabric grid. All normal design requirements of a computing device or system can be satisfied without careful positioning or mounting, allowing fabrics or cable-connected segments to twist and dangle, and segments to lie near or be heaped together up to limits imposed by heat dissipation.

Stackable interconnected modular electronic components have been described in various references, such as in U.S. Pat. Nos. 5,984,732, 5,602,721, 6,073,333, 5,909,357, 6,469,901, 5,737,189, 6,698,851, 5,949,644, 6,597,569, and 5,761,032. These types of structures still require a relatively rigid physical form, such as specialized "foot" to enforce rigidity (U.S. Pat. No. 5,984,732), rails (U.S. Pat. No. 5,602,721), particular shape of the modules (shape matching) (U.S. Pat. No. 6,073,333, U.S. Pat. No. 5,909,357), cooling shaft (U.S. Pat. No. 5,909,357), a rigid receptacle for routing signals (U.S. Pat. No. 6,469,901), rigid enclosure with sled (U.S. Pat. No. 5,737,189), and rigid housing (U.S. Pat. No. 6,698,851, U.S. Pat. No. 5,949,644, U.S. Pat. No. 6,597,569, U.S. Pat. No. 5,761,032). Most of these systems require the modules to be vertically stacked.

Another feature of embodiments of the present invention is that the components are reconfigurable, so that chassisless segments can be connected or disconnected without bringing the program or system down. Hot-plugging hardware is supported by a software design that allows reconfiguration events to take place within program or system function. Hot reconfiguration may include plugging multiple segments together to enhance computing power. Hot-plugging of certain types of peripheral components is generally known; embodiments of the present invention improve the general technology and apply it to the chassisless environment.

Yet another feature of embodiments of the present invention is that the segments are designed to be capable of easy connection to a standard host computer and/or data device(s), so that programming and data can be loaded from the host and/or the data device(s), and computations be done with multiprocessing efficiency, in order that the segments can serve as an auxiliary computing engine of indefinitely expandable power. At the same time, other embodiments of the invention may be self-sufficient or "embedded" with software pre-loaded, for instance in Read-Only Memory (ROM), so that connection to a standard host computer or data device(s) or other segments can bring the segment on line and already functional.

It can be seen that by combining all of these features, one reaches a new ease of applying computing power. For example, a host, groaning under an exceptionally heavy computing task, may gain speed and power in the middle of its run as new computing segments are plugged into it and into each other. These may be handed like Christmas lights from storage drawers, or even popped loose from another running host whose task is less urgent. When their task is done, they can be carried elsewhere, without any need to struggle with shared network bandwidth or software resource allocations, and without heavy wheeled transport devices or dangerous lifting or handling of any large, clumsy, sharp-cornered chassis.

A computing segment according to embodiments of the present invention may take the physical form of a "rope" (FIG. 1(a)) or other suitable forms. FIG. 1(a) schematically depicts a computing segment 100 having two end connectors 102 and 104. One connector 102 (a host mating connector) is adapted for plugging into a data port (such as a USB port) as well as a power outlet on a chassis (not shown) of a host computer. The host computer may be any computer such as a conventional computer having a chassis, or it may be a computing segment according to embodiment of the present invention. The connector 102 is shown in FIG. 1(a) as having two separate prongs adapted to be plugged into two separate locations on the host chassis, but it may also be a single prong plugged into a single outlet that provides both data connection and power, or take any other suitable form depending on what is offered by the host chassis. The other connector 104 is an extension connector adapted for receiving a connector of another computing segment. As depicted in FIG. 1(a), the rope segment contains one or more computing devices (nodes) 106 and one or more power units (locomotives) 108. Each node and locomotive is connected to appropriate data and power lines; the lines and the nodes and locomotives are then enclosed together in a suitable enclosure 110 such as a shrink wrap to form the segment. This is illustrated with more detail in FIG. 1(b), which schematically depicts a rope segment 100 containing one power unit 108 and a number of CPUs 106 suitably connected by connection wires and enclosed in a material 110. The rope segment 100a shown in FIG. 1(b) has a connector 104a adapted for mating with a connector 104 of another segment (rather than to a chassis of a host computer as in FIG. 1(a)).

Figure 1B:
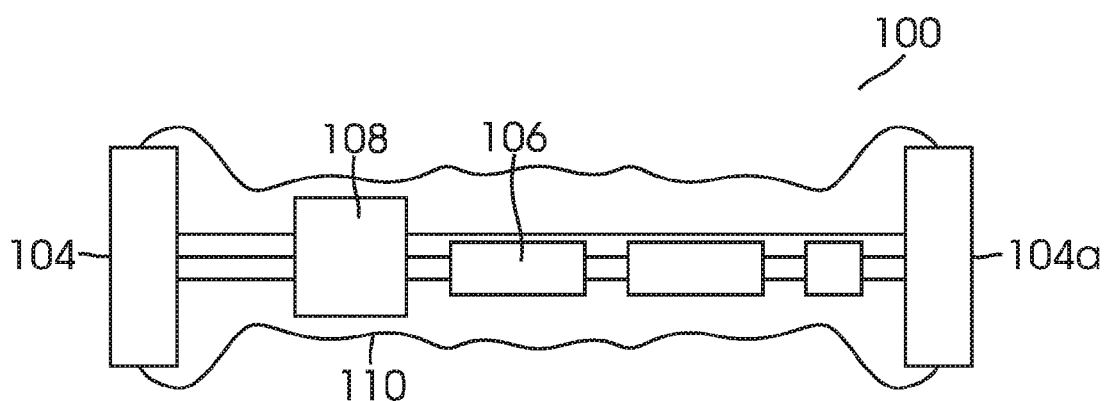

A segment having a host mating connector 102 as shown in FIG. 1(a) is referred to as a host mating segment, whereas a segment having two non-host mating connectors 104 and 104a shown in FIG. 1(b) is referred to as a non-host mating segment or a generic extension segment. Unlike the host mating connector 102, the non-host mating connectors 104 and 104a of a generic extension segment may be designed independent of the physical requirements of the host chassis, so long as they are compatible with each other. Another type of segment (not shown) may be a segment connected to a peripheral, which will have a mating end adapted for specific peripherals. For each rope segment, one end (e.g. the connector 102 or 104a) may be referred to as the root end or the near end and the other end (e.g. connector 104) may be referred to as the leaf end or the far end. Alternatively (not shown), a rope segment may have one root end connector and two or more leaf end connectors forming a branch. The segment can communicate and function properly after only one connection, the root end connection, is connected to a powered mating connection. Its other connections, if any, can be plugged into mating host(s), peripheral(s), or other segment connection(s) and communicate and function properly with them after sharing ground and communicating or sharing power.

Figure 2A:
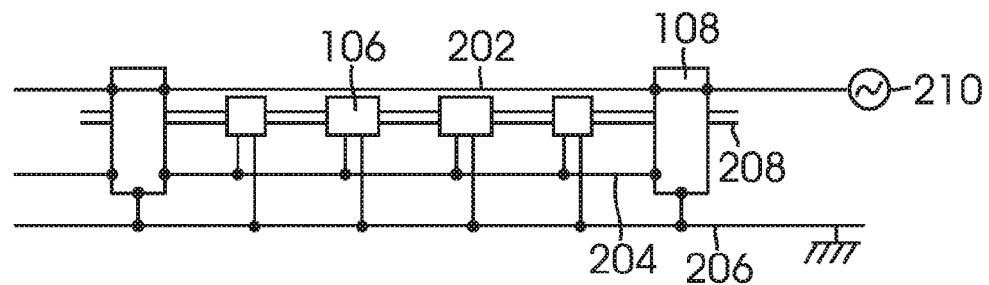
FIG. 2(a) illustrates an example of component interconnection in a segment according to embodiments of the present invention.

FIG. 2(a) illustrates an example of component interconnections in a segment according to embodiments of the present invention. Lines 202, 204 and 206 represent a high voltage line (either AC or DC, provided by an external source 210), a low voltage line, and a ground line, respectively. Any of these three lines may include a plurality of physical lines, as dictated by design requirements. Line 208 represents a data line which typically includes a plurality of physical lines. One or more locomotives 108 are connected to the voltage lines 202, 204 and 206, and functions to supply power on the low voltage line 204 using power (AC or DC) supplied on the high voltage line. Alternatively, some locomotive 108 may only be connected to the high voltage line and ground (and not connected to the low voltage line), and function as a filter for the high voltage power line. Each of the one or more nodes 106 (CPU and/or memory) is connected to the high voltage line 204, ground 206 and the data input/output line 208. A locomotive and a node may be combined into one physical unit, in which case such locomotive/node unit will be connected to the voltage lines 202, 204 and 206 as well as the data line 208. As another alternative, the high voltage line 202 may be eliminated and the power may be directly provided to the low voltage line 204 from an external source (not shown) In this case, the locomotive may function as a filter during connect and disconnect events.

Generally, the locomotive may perform one or more of the following functions: filtering the disturbances due to hot-plugging and hot-unplugging, supplying startup and buffering shutdown power, supplying power to the nodes between startup and shutdown, delaying the start of IO until stable time (time interval from a connection event after startup until the time of a disconnection event at the beginning of shutdown), and detecting the connection and disconnection events and responding to them in such a way that all IO behavior between connection and disconnection events is correctly modeled by the computing state machine. This response may include prevention of spurious communication signals due to contact bounce and capacitive current inrush, establishment of correct electrical state for start of IO at startup, and proper termination of IO at shutdown, including prevention of partial or malformed IO transmissions.

Any suitable design may be employed for the power supply function of the locomotive. Existing technologies provide power supplies and converters that are sufficiently small and lightweight for these purposes. For example, N2Power (www.n2power.com) offers AC-DC converters with a power density of 8.5 W/cubic inch, or approximately 18 g/W. Another example of commercially available small power supply/converter device is Calex's Subminiature converters, which weigh about 5.7 oz (including case) and output about 1.5 W of power.

A computing system according to embodiments of the present invention may consist of a number (which may equal zero) of non-host mating segments connected together and connected to a host computer via a host mating segment. Each segment is encased by a material or materials, from which all connectors protrude, that are tough and impervious enough to permit handling of the segment using bare hands without special mechanical or electrical precautions. Preferably, each segment is light and small enough to permit handling by one person without leverage or mechanical aid. In addition, the segments are small and cool enough to permit heat dissipation by air convection in normal use. Preferably, each node dissipates one watt or less of power during normal usage. Each segment is capable of being mechanically supported by its root end connector without a chassis, thus eliminating the need for frames, slots, or mounting bolts other than the bolts that are part of the connector itself. For example, with current technologies, a segment providing adequate computing power or other functionalities may be made to weigh on the order of a few ounces. Rapid increases in computing efficiency will make such segments more lightweight. Meanwhile, typical bolt-secured connector assemblies are, or can easily be designed to be, able to support a force on the order of a pound and the corresponding torque (weight times the largest lever arm dimension of the segment) without degradation of performance. Preferably, the connector assembly has a strength at least ten times the weight of a typical segment. Furthermore, when a number of segments are connected together, the collectivity of segments can be supported through the connector to the host chassis so long as the number of segments is within a reasonable limit. So supported, the segments function properly when randomly oriented, twisting, dangling, toppled, or piled together with other segments, so long as needed heat dissipation is possible.

The computing segments according to embodiment of the present invention preferably have hot swap connector assemblies capable of connecting ground, power, low voltage lines, and data lines in such a way that connection and disconnection deliver a sane signal to any monitoring computer logic and software. Hot swap or hot plug connections are generally known in the art and are widely used in, for example, disks. For example, U.S. Pat. No. 6,447,309 describes suppressing power bus bouncing in a hot-swappable system. U.S. Patent Application 2001/0011314 describes a data server with hot replaceable processing unit modules. The Serial ATA standards support hot swapping capabilities (see www.serialata.org). The above hot swapping technologies, however, are aimed at peripheral and network devices and are designed only within standard chassis.

In embodiments of the present invention, due to the low power requirements, hot swap connections may be improved or simplified to require only two connector lengths instead of three as found in certain existing devices. For example, in Serial ATA devices manufactured by Maxtor Corporation, three lengths of connectors (pins) were provided for hot plug: (1) static discharge, (2) high-impedance precharge of power, and (3) low-impedance power and data connections. In embodiments of the present invention, however, the locomotive may be designed to handle the sequencing of (2) and (3) above, allowing two lengths to be used instead of three. To accomplish this, the locomotive turns on power to the CPUs only after its own charge up is completed.

Figure 2B:
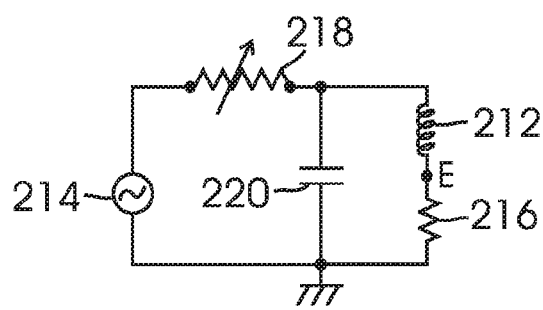
FIGS. 2(b) and 2(c) are partial circuit diagrams showing power units according to embodiments of the present invention.
Figure 2C:
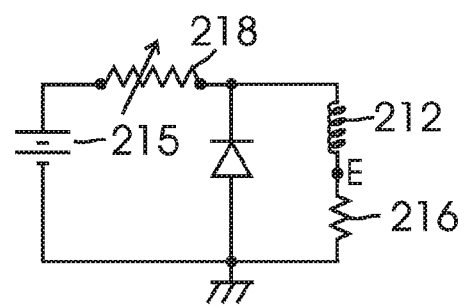

FIGS. 2(b) and 2(c) are partial circuit diagrams for two examples of locomotives (power units) for AC and DC power sources, respectively. The circuit of FIG. 2(b) can also be used for a DC source if the capacitance of the capacitor 220 (see below) is sufficiently large. The locomotive in each case includes an inductor 212 connected in series with the power supply 214 or 215 and the load 216, such that upon hot-plugging the power, the voltage variation due to contact bounce connection and disconnection is substantially prevented from affecting the circuit on the far side of the inductor from power. Switch 218, although shown as a part of the circuit, may be in fact physically a part of the external connector. For an AC source, the locomotive also includes a capacitor 220 connected in parallel to the inductor 212 and load 216. Upon detection of the beginning of a disconnection event, the switch 218 disconnects the inductor 212 from power 214 or 215 and connects the former power connection of the inductor 212 to ground (in the DC case) or to the capacitor 220 (in the AC case), with the result that the inductor or inductor/capacitor combination powers the segment long enough for orderly shutdown. The switch 218 is preferably a linear conductance contact switch, such as a pin, so that the conductance increases linearly from zero to a full conductance value when the pin is inserted into the receiving slot. The resistance of such a switch is proportional to 1/t where t is the time after the first contact. Such a switch eliminates current or voltage spike at t=0. This circuit effectively minimizes contact bounce voltage at point E (the load). After disconnect, the decay time of the voltage is approximately the longer of RC or L/R. In FIGS. 2(b) and 2(c), the load 216 represents the actual loads together with other necessary circuitry of the power unit such as a converter. The locomotive additionally includes delay and hysteresis circuitry (as a part of the load 216 in FIGS. 2(b) and 2(c)) sufficient to delay power to the nodes until voltages are stable under the power requirements of all parts of the segment.

This locomotive will cooperate with a connector that has a ground pin longer than power and signal pins. To deal with surprise or unplanned disconnect events, the connector may also have a shortest pin which is triggered the earliest for detecting a disconnection event. Other suitable structures may also be used for generating or detecting a disconnect signal prior to the connector disconnecting the power, signal and ground lines from the external device.

Examples of components useful for implementing such a locomotive include a 55 mH inductor made by Mouser (TRIAD CST306-3A) with a physical size less than 1 by 1 by 0.4 cubic inches, a decay half-life (L*log(2)/R) over 10 msec, and current capacity of 25 amps. As discussed in various literature, hot plug bounce occurs on the order of a millisecond, and the period of a voltage fluctuation during the bounce time interval is less than 100 microsecond. Literature also discusses the use of choke in the hot line to clean up high frequency noise (see www.du.edu/-etuttle/electron/elect5.htm), and the use of dv/dt chokes in power supplied (see www.reo.de/pdfs/chi811q.pdf).

Preferably, embodiments according to the present invention include a software logic and state machine capability that controls the connection and disconnection events within program runs that are exploiting the intercommunicating and parallel multiprocessing potential of the many nodes. The state machine and programming capability permit the collectivity of connected segments, together with appropriate host(s) or peripheral(s), to be reconfigured by hot-plugging or hot-unplugging segments, without having to reboot or reload programs, either to survive a hot-plugging or hot-unplugging event, or to adjust the resources in use to add or remove the segment just hot-plugged or hot-unplugged. During stable time (the time interval from a connection event after startup until the time of a disconnection event at the beginning of shutdown), a computing segment can predictably compute and communicate. Various components of the state machine functionality reside on the host computer and each segments.

The state machine functionality that controls the connection and disconnection events may be implemented using extensions of known technologies. For example, the Transputer of Inmos Ltd pioneered the hardware and programming concepts necessary for robust reconfigurable multiprocessing. See, for example, The Transputer Databook, Inmos Ltd 1992, chapter 13: "IMS C004 programmable link switch". The B008, a board mounted within a standard chassis, itself supported daughterboards called TRAMs with general connectivity and program loading capability. In this device, however, hot reconfiguration was limited to reprogramming a crossbar switch between physically fixed TRAM connections. Transputer-like interconnect designs have been developed by others, such as IBM (the "Advanced Parallel Array Processor" or APAP, described in, e.g., U.S. Pat. Nos. 5,717,943 and 5,617,577). All of these general designs are described as having been realized in physical forms limited to standard chassis designs and do not address physical hot-swapping. Software support of reconfiguration within a system or program run is developed by the present inventor and described in Dickson, Lawrence J., "occam(TM) Road Map for the DOS PC", Proceedings of the International Conference on Parallel and Distributed Processing Techniques and Applications, 1010-1019 (1996) ("the PDPTA'96 paper"). This paper uses the term "hot switching" in a limited sense to refer to connecting and disconnecting software within a system based on hardware whose configuration is electrically fixed during any given run. However, its communications state sequences may serve as the foundation for control software that enables the hot swapping capability of the computing segments according to embodiments of the present invention. The techniques of programming complex systems in standard languages to behave predictably under well-defined communication conditions are further developed by the present inventor and described in commonly owned U.S. Patent Publication 2004/0158833, filed Feb. 10, 2003.

Figure 3:
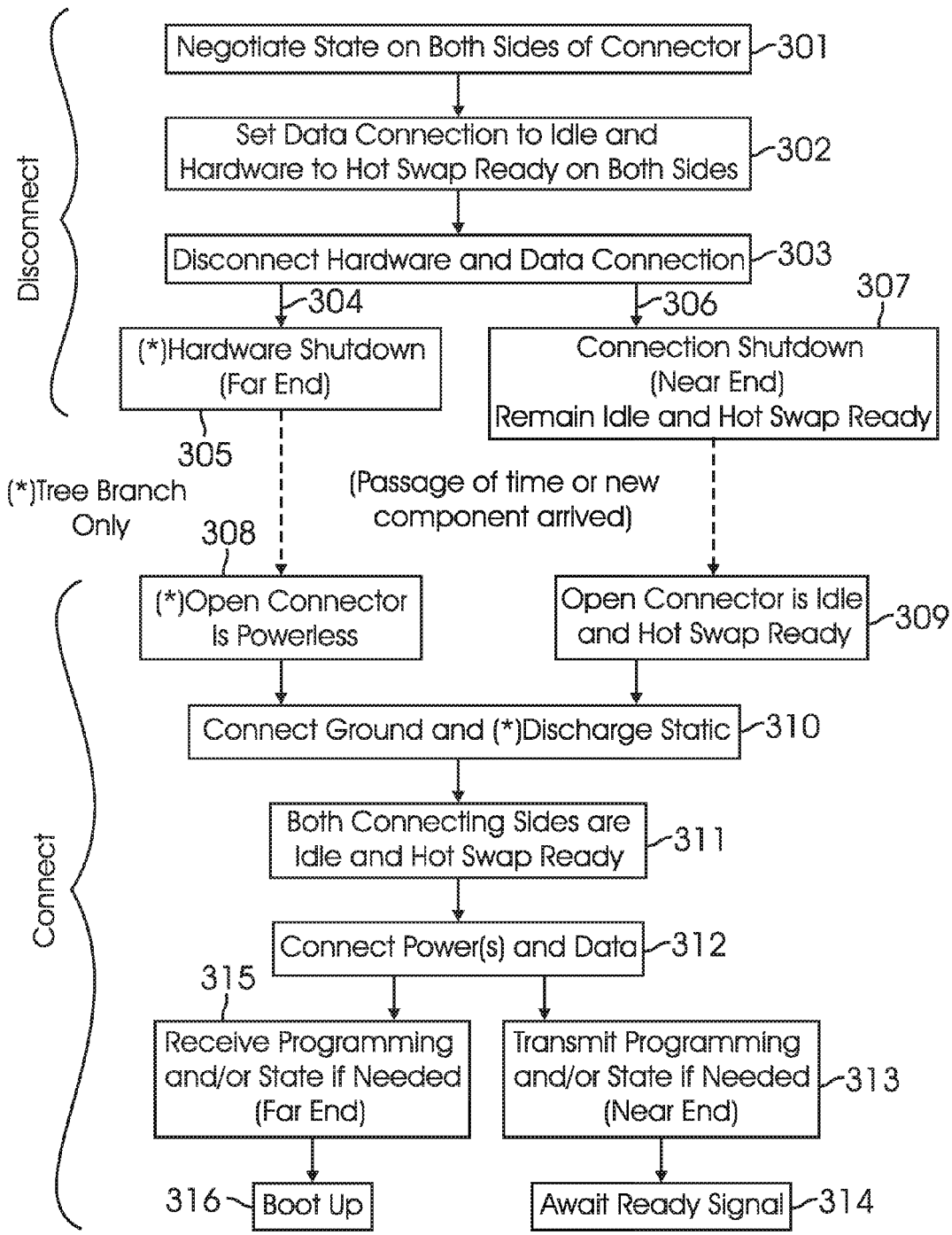
FIG. 3 illustrates a control flow of hot swap involving physical disconnection and connection of components.

None of the above-described existing techniques addresses physical hot swapping. Embodiments of the present invention extends the logic for reconfiguring independent communicating software programs during a run described in the PDPTA'96 paper to hardware-connectivity-based programming and hardware reconfiguration within a run, as illustrated in FIG. 3. FIG. 3 illustrates a Disconnect process and a Connect process, both hot swapping. At the beginning of the Disconnect process, the control program negotiates states on both sides of a connector (301). The program sets data connection to Idle and hardware to Hot Swap Ready on both sides of the connector (302). In step 303, the hardware is physically disconnected. At the far side, i.e. the components that has been disconnected (represented by arrow 304), the hardware may be shut down (305). Step 305 occurs when the far end is a tree branch and not a part of a loop. In a loop, the far side would be connected to the root via some other connections and will thus not shut down. At the near side, i.e. components that remain connected to the control process (represented by arrow 306), the data connection is shut down, and the connector remains in Idle state and is Hot Swap Ready (307).

This state continues until a new connection is to be made. The far side of the new connection may be the hardware that has been previously disconnected, or a new hardware component. At the beginning of the Connect process, the far side component is in an open connector which may be in a powerless state (308) if the far side is a tree branch. The near side component is an open connector in an Idle and Hot Swap Ready state (309). In step 310, the ground line is connected. This step may also discharge static electricity if the far side is a tree branch. At this time, both connecting sides are Idle and Hot Swap Ready (311). The power line(s) and data line(s) are then connected (312). If the far side node has no programming of its own, then the near side control program transmits programming and/or state to the far side (313) and awaits ready signal from the far side (314). The far side receives the transmitted programming and/or state (315) and then boots up (316). Steps 313 and 315 may be omitted if the far side has its own programming. It is noted that the transmission of a program onto a fresh CPU, connected but in a reset state, has been known in the art, of which one example is the Transputer "Boot from Link" state machine functioning on chips designed in the 1980s.

In the above description, the terms "far side" and "near side" are used with respect to a connection. These relative concepts are valid when the connection is a tree connection, i.e., when it is not a part of a loop. However, according to a well-known mathematical theorem, any connected graph contains a subgraph which connects all its nodes and is a tree, that is to say, is a graph without loops. In addition, one can select any one edge of the connection graph and require it be in that tree. Therefore, by conceptual elimination if necessary of some connection edge(s), the terms "far side" and "near side" can be applied to any connection. Also, in this specification, the concept of "near" vs. "far", "root" vs. "branch" (or "leaf") are pairs of concepts that are sometimes used interchangeably.

Figure 4:
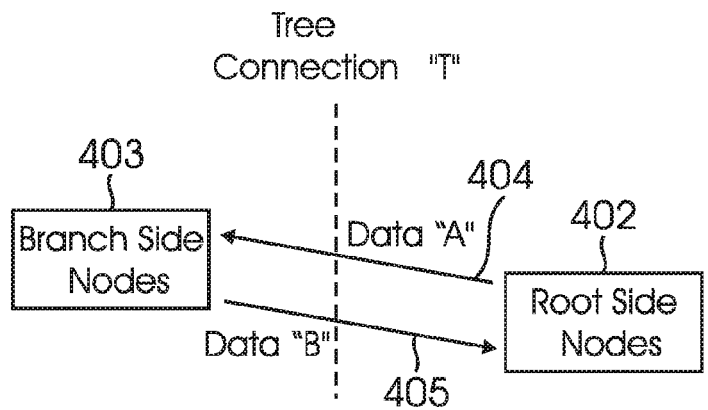
FIG. 4 further illustrates the control flow of hot swap involving physical disconnection and connection of components.

FIG. 4 further illustrates the "negotiate" step (301) in FIG. 3. Root side nodes 402 and branch side nodes 403 are schematically shown located at each side of a line 401, which represent an edge in the graph theory sense and a physical connection in embodiments of the present invention. In case the connected segments (the graph) includes loops, it is assumed that a fixed set of edges is conceptually eliminated so that the remainder form a subtree, or subgraph that is a tree, spanning all the nodes and including 401, according to the mathematical theorem mentioned in the above paragraph. If the connection graph does not include loops, then the entire connection graph is the subtree. In both cases, the tree is the subtree. Here, "branch side nodes" are all nodes that cannot get to the root through the subtree without going through the edge (physical connection) 401, and root side nodes are all other nodes. The "root" of the tree is the connection to the host. The negotiating step (301 of FIG. 3) involves exchange of data across the edge (physical connection) 401 as depicted in FIG. 4. Here, Data "A" 404 represents any data required by branch side node(s) which has to come from root side node(s) or from host, and may include boot programming. Data "B" 405 represents any data required by host or root side node(s) which has to come from branch side node(s). This is one method sufficient to program and drive all nodes. Other suitable methods may also be used.

Figure 5:
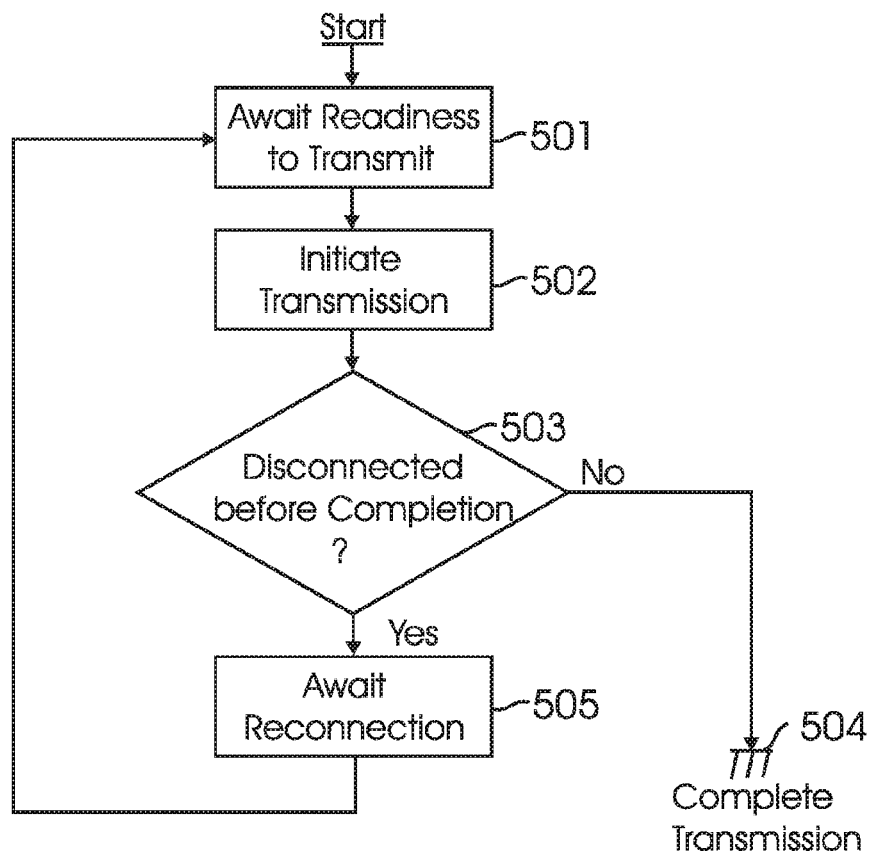
FIG. 5 is a flow chart illustrating a disconnection and connection method.

In some data transmission protocols, an amount of data is committed for transmission on hardware independent of success feedback. FIG. 5 illustrates a method by which a disconnection and connection can be spanned within the transmission by a retransmission controlled by disconnection detection. This permits disconnection and connection events to take place even after a data transmission is committed and before it is completed, without high level software enforcing a pause. As shown in FIG. 5, after transmission is initiated (502), the control program monitors whether a hardware connection is disconnected before transmission is completed (503). If no disconnection occurs, transmission completes (504). If a disconnection occurs, the program is in a state where it awaits a reconnection (505). Once reconnection is established, the program enters a state where it waits (501) until it is ready to initiate a transmission (502). This control method is useful in hardware hot swapping that can endure a "surprise disconnection". Similar concepts in a different context (software hot-swapping) are discussed in the PDPTA'96 paper, which may be referred to for details if desired.

A method useful for dealing with surprise of unplanned disconnect event is to transmit data in units of a fixed data unit size, so that each transmission of data is of an integer multiple of the data unit size. Each transmission of data of the data unit size is either acknowledged by the receiver or terminated by a disconnection event. If a disconnection occurs without the transmission of a data unit size being acknowledged, the transmitting program can continue to run until detecting a connection event on the same connector. The program keeps a copy of the interrupted data transmission and can resend it after the reconnection event.

In order to implement the state machine and software programming requirements of the embodiments of the invention, one type of program that can run on a computing segment or on one or more of its nodes is referred to as a "focus program". A focus program can receive or transmit information on a point-to-point IO channel, either to another program running on the same segment, or across an IO (data) line of a connector, in the following manner. The focus program can reach transmission readiness on its side of the IO channel irrespective of whether a device on the other side is active or not, i.e., whether the program on the other end is running, has been loaded, or exists in any way, or in the case of a connector irrespective of whether there is or is not mating hardware present on the other side of the connector, and then proceed correctly when a device on the other side is active, i.e., in the case of a connector, the mating hardware (if necessary) is connected, has booted, reached stable time, loaded its program (possibly across the same connector), activated its program, and communicated on its end of the IO channel, or, in the case of another program within the segment, this other program (if necessary) is created, loaded, activated, and communicates on its end of the IO channel. The focus program can reach conditional readiness for a set of conditions that can include timeouts, transmission readiness on one or more IO channels, and other conditions that can change from false to true, and then proceed when one of the conditions becomes true, on a program branch based on which of the conditions is chosen. In the case of transmission readiness on an IO channel, the condition evaluation proceeds irrespective of whether the program on the other end is running, has been loaded, or exists in any way, or in the case of a connector irrespective of whether there is or is not mating hardware on the other side of the connector, and readiness on this IO channel becomes true when, in the case of a connector, the mating hardware (if necessary) is connected, has booted, reached stable time, loaded its program (possibly across the same connector), activated its program, and become ready to communicate on its end of the IO channel, or, in the case of another program within the segment, this other program (if necessary) is created, loaded, activated, and becomes ready to communicate on its end of the IO channel. The focus program given sufficient resources can trigger nested programs, after loading them (if necessary), and the nested programs can themselves act as focus programs according to the above requirements.

The computing segments described above, together with one or more host computers (which may be a computing segment or a computer that is not a computing segment), and any optional peripheral devices, may be connected to form a reconfigurable computing system. At any time between bootup and shutdown, the reconfigurable computing system operates through the capability of sending or receiving IO and programming for each host computer and segment. On each host (whether or not it is a computing segment), at least one "host focus program" can be run, using as IO channels the IO (data) lines of any connectors connected to that host. The host focus program has the properties of a focus program described above. If a host focus program with sufficient resources is running on a host not connected to any segments, a segment can be hot-plugged to this host via a connector, and the host focus program can, after loading programming to this segment (if necessary), and activating it (if necessary), communicate with a running program or programs on this segment. If a host focus program is in communication with programming running on a segment connected directly or indirectly with the host, the host focus program can, without being stopped, unloaded or killed, have that communication link be placed by normal program control in a "segment paused" state wherein the segment can be hot-unplugged. In the meantime, the host focus program can continue running with the capabilities it would have had if the segment had never been connected, or was continually connected but had not yet responded to the latest communications. If the same or a different segment is connected later with appropriate programming, the communication link can leave this "segment paused" state and the host focus program can resume running as if the communication link had never been disconnected but had merely gone temporarily silent.

One particular example of implementation of a focus program is an extension of a method described on page 1016 of the PDPTA'96 paper, which addresses basic reload and reconfiguration capability using an occam harness of the form:

CHAN OF ANY ch:
PAR
   first part running in parallel:
   this is the part that keeps running in root side master(ch)
   second part running in parallel:
   this is the part operating on the reconfigured side
SEQ
   this one runs, finishes, and relinquishes its resources inner1 (ch)
   a shutdown of indefinite duration occurs here
   and the code for inner2 may be loaded from scratch inner2 (ch)

Although the PDPTA'96 paper was limited to operating system unloading and reloading "behind the back" of the first member of the PAR, using the DOS PSP mechanism with uninterrupted hardware resources, the principle—that if resources used by the root side are undisturbed, the state machine will operate correctly—remains valid for hardware swaps. Thus the method described therein can be used to implement the focus program.

As noted, many components of embodiments of the present invention take advantage of existing technologies or are extensions of existing technologies. One aspect of the invention is a combination of these technologies into a new and unique physical form that offers many advantages over the current chassis based computing devices.

It will be apparent to those skilled in the art that various modifications and variations can be made in the method and apparatus of the present invention without departing from the spirit or scope of the invention. Thus, it is intended that the present invention cover modifications and variations that come within the scope of the appended claims and their equivalents.

What is claimed is:

1. A computing device adapted for connecting to one or more external devices, comprising:
   one or more external connectors each adapted for connecting to an external device and including at least a ground line, a power line and one or more data input/output (I/O) lines;
   one or more computing nodes connected to each other and to the external connectors, each computing node including a central processing unit, a memory, or an input/output interface, wherein at least one computing node has a computing state machine and programs that describes and controls the behavior of the computing nodes at least during a connection event when an external connector is being connected to an external device and during a disconnection event when an external connector is being disconnected from an external device;
   a power unit connected to the external connectors and the computing nodes for supplying power to the computing nodes or for filtering signals on the power line; and
   a flexible enclosure structure encasing the external connectors, computing nodes and power unit and adapted to permit the external connectors to be connected with external devices, the enclosure structure being made of flexible materials, wherein the computing device is free of any user data input devices exposed through the flexible enclosure, whereby the computing device forms a physically integrated unit by the enclosure structure free of a rigid frame.

2. The computing device of claim 1, wherein the computing device has a weight of less than about one pound and wherein the external connectors are capable of mechanically supporting the computing device.

3. The computing device of claim 1, wherein each computing node dissipates one watt or less of power during normal usage.

4. The computing device of claim 1, comprising at least two external connectors.

5. A method of using a plurality of the computing devices of claim 4, comprising:
   connecting a first external connector of a first computing device to the host computer; and
   connecting a first external connector of a second computing device to a second external connector of the first computing device.

6. The computing device of claim 1,
   wherein the external connector includes a switch connected to the power line,
   wherein the power unit comprises an inductor connected in series with the power line voltage; and
   wherein the switch is coupled to disconnect the inductor from the power line upon detection of the beginning of a disconnection event.

7. The computing device of claim 6, wherein each external connector further comprises a detector for detecting a disconnection event, the external connector being adapted to be connected to an external device such that a connection for the detector is disconnected first, the power and data lines are disconnected second, and the ground line is disconnected last.

8. The computing device of claim 1, wherein at least one computing node is programmed to receive or transmit information on the I/O lines from or to another computing node or an external device, to be in transmission readiness regardless of whether a corresponding program on the other computing node or the external device is ready, and to receive or transmit information when the corresponding program is ready, whereby the computing nodes of the computing device communicate with each other or with an external device across the I/O lines of the external connector.

9. The computing device of claim 8, wherein the at least one computing node is programmed to reach conditional readiness for one or more predetermined conditions, and to proceed when one of the conditions becomes true, on a program branch based on which of the conditions is chosen.

10. The computing device of claim 9, wherein the conditions include timeouts.

11. The computing device of claim 9, wherein the conditions include transmission readiness on the I/O lines, wherein the condition is evaluated regardless of whether the corresponding program on the other computing node or the external device is ready.

12. The computing device of claim 8, wherein the at least one computer node is programmed to trigger nested programs to receive or transmit information on the I/O lines.

13. A reconfigurable computing system comprising one or more computing devices of claim 1 and one or more host computers,
wherein each host computer has an outlet adapted to be connected to an external connector of a computing device, the outlet including at least a ground line and one or more data input/output (I/O) lines;
wherein the outlet of at least one host computer includes a power line;
wherein each computing device is connected via external connectors to a host computer or another computing device such that each computing device is connected to a host computer either directly or through other computing devices;
wherein each computing device has at least one computing node programmed to receive or transmit information on the I/O lines from or to another computing device or host computer connected to the computing device, to be in transmission readiness regardless of whether a corresponding program on the connected computing device or host computer is ready, and to receive or transmit information when the corresponding program is ready;
wherein each host computer is programmed to receive or transmit information on the I/O lines from or to a computing device connected to it, to be in transmission readiness regardless of whether a corresponding program on the connected computing device is ready, and to receive or transmit information when the corresponding program on the connected computing device is ready;
whereby the computing devices and the host computers form a connected set and communicate with each other through the I/O lines.

14. The reconfigurable computing system of claim 13, wherein each computing device stably functions and communicates with other connected computing devices or host computer after any one of the external connectors of the computing device is connected to a host computer or another computing device that is powered.

15. The reconfigurable computing system of claim 13, wherein at least one computing device or host computer is programmed to detect another computing device, which is not previously connected to the at least one computing device or host computer, being connected to the computing device or host computer, and to communicate with the other computing device.

16. The reconfigurable computing system of claim 15, wherein the computing device or host computer loads programming to the other computing device after detecting the other computing device being connected.

17. The reconfigurable computing system of claim 13, wherein the host computer is programmed to place communications between a first computing device or the host computer and a second computing device in a paused state by normal program control, thereby allowing the second computing device to be disconnected from a host outlet or an external connection without pausing the programming on the first computing device or the host computer.

18. The reconfigurable computing system of claim 17, wherein the host computer is programmed to cause a communication previously placed in a paused state to leave the paused state and continue running after another computing device is connected to the host outlet or external connection from which the second computing device was disconnected, the other computing device being either the second computing device or a different computing device.

19. The reconfigurable computing system of claim 13, wherein each external connector of the computing devices includes a circuit for detecting a connection or disconnection event, wherein a transmitting computing device is programmed to transmit data in units of a data unit size, wherein a receiving computing device is programmed to transmit an acknowledgement after receiving each transmitted data of the data unit size, wherein the transmitting computing device is programmed such that if a data transmission of the data unit size is terminated by a disconnection event without the transmitting computing device receiving an acknowledgement, the transmitting computing device keeps a copy of the interrupted data transmission and retransmits the data if the disconnected receiving computing device is reconnected.

20. The reconfigurable computing system of claim 13, further comprising one or more peripheral devices each connected to a computing device.

21. A computing device adapted for connecting to one or more external devices, comprising:
one or more external connectors each adapted for connecting to the external device and including one or more data input/output (I/O) lines, each external connector including circuitry for generating or detecting a disconnect signal prior to the disconnection of the external connector from an external device;
one or more computing nodes connected to each other and to the external connectors, each computing node including a central processing unit, a memory, or an input/output interface, wherein at least one computing node has a computing state machine and programs that describes and controls the behavior of the computing nodes at least during a connection event when an external connector is being connected to an external device and during a disconnection event when an external connector is being disconnected from an external device;
wherein at least one computing node is programmed to receive or transmit information on the I/O lines from or to an external device, to be in transmission readiness regardless of whether a corresponding program on the external device is ready, to receive or transmit information when the corresponding program is ready, to reach conditional readiness for one or more predetermined conditions, and to proceed when one of the conditions becomes true on a program branch based on which of the conditions is chosen, the conditions including transmission readiness on the I/O lines and the condition being evaluated regardless of whether the corresponding program on the external device is ready, wherein the computing nodes of the computing device communicate with an external device across the I/O lines of the external connector.

* * * * *